(12) United States Patent
Parenta et al.

(10) Patent No.: US 12,337,803 B2
(45) Date of Patent: Jun. 24, 2025

(54) WIPER BLADE DEVICE, WINDSHIELD WIPER COMPRISING A WIPER BLADE DEVICE, VEHICLE COMPRISING A WIPER BLADE DEVICE, AND METHOD FOR OPERATING A WIPER BLADE DEVICE

(71) Applicant: Robert Bosch GmbH, Stuttgart (DE)

(72) Inventors: Denis Parenta, Veternik (RS); Aleksandar Stanisic, Belgrad (RS); Alexander Goeller, Baiersbronn (DE); Andreas Biank, Oberlauterbach (FR); Andrija Terentic, Belgrad (RS); Frank Reinig, Buehlertal (DE); Harald Rapp, Buehl (DE); Michael Kruse, Sinzheim (DE); Najdan Jocic, Pancevo (RS); Raf Greunlinx, Zolder (BE); Salvatore Formisano, Malsch (IT); Sascha Geissler, Lichtenau (DE); Steven Lenaerts, Tienen (BE); Stijn Truyens, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 18/066,583

(22) Filed: Dec. 15, 2022

(65) Prior Publication Data
US 2023/0192037 A1 Jun. 22, 2023

(30) Foreign Application Priority Data
Dec. 16, 2021 (DE) .................... 10 2021 214 516.7

(51) Int. Cl.
*B60S 1/52* (2006.01)
*B60S 1/56* (2006.01)

(52) U.S. Cl.
CPC ................ *B60S 1/524* (2013.01); *B60S 1/56* (2013.01)

(58) Field of Classification Search
CPC ..................... B60S 1/524; B60S 1/522; B60S 1/3886–1/3896; B60S 1/52; B60S 1/482; B60S 1/483; B60S 1/56
See application file for complete search history.

(56) References Cited

U.S. PATENT DOCUMENTS

| | | | |
|---|---|---|---|
| 2006/0043110 A1* | 3/2006 | Miyauchi | B05B 15/654 222/129.1 |
| 2015/0090291 A1* | 4/2015 | Na | B60S 1/56 134/6 |

(Continued)

FOREIGN PATENT DOCUMENTS

| | | |
|---|---|---|
| CN | 102652083 A | 8/2012 |
| DE | 102012004636 A1 | 6/2013 |

(Continued)

OTHER PUBLICATIONS

WO2020136083A1(machine translation) (Year: 2020).*

*Primary Examiner* — Andrew A Horton
(74) *Attorney, Agent, or Firm* — Michael Best & Friedrich LLP

(57) ABSTRACT

A wiper blade device (10a; 10b) is disclosed comprising at least one wiper blade unit (12a; 12b), which comprises at least one fluid line (14a; 14b) for conducting a fluid and at least one dispensing element (16a; 16b) for dispensing the fluid onto an object to be cleaned. It is proposed that the dispensing element (16a; 16b) has at least one dispensing opening (18a; 18b) which is arranged on an end surface region (20a; 20b) of the wiper blade unit (12a; 12b).

10 Claims, 3 Drawing Sheets

(56) References Cited

U.S. PATENT DOCUMENTS

2019/0381974 A1   12/2019  Caillot et al.
2021/0046906 A1*  2/2021  Depondt ............... B60S 1/3894
2021/0221334 A1*  7/2021  Friscioni ................ B60S 1/482

FOREIGN PATENT DOCUMENTS

FR          2991948 A1   12/2013
WO   WO-2020136083 A1 *  7/2020  ............. B60S 1/381

* cited by examiner

WIPER BLADE DEVICE, WINDSHIELD WIPER COMPRISING A WIPER BLADE DEVICE, VEHICLE COMPRISING A WIPER BLADE DEVICE, AND METHOD FOR OPERATING A WIPER BLADE DEVICE

BACKGROUND

A wiper blade device comprising at least one wiper blade unit, which comprises at least one fluid line for conducting a fluid, and at least one dispensing element for dispensing the fluid onto an object to be cleaned, has already been proposed.

SUMMARY

The invention proceeds from a wiper blade device comprising at least one wiper blade unit which comprises at least one fluid line for conducting a fluid, and at least one dispensing element for dispensing the fluid onto an object to be cleaned.

It is proposed that the dispensing element has at least one dispensing opening which is arranged on an end surface region of the wiper blade unit. The dispensing element is in particular provided to dispense a fluid conducted through the fluid line. The fluid line is preferably designed in the manner of a tube, hose or the like. The fluid is preferably a cleaning liquid, for example water or the like. Alternatively, it is also conceivable for the fluid to be air or a liquid/air mixture. For example, the dispensing element is alternatively or additionally provided to apply air to the object, in particular to dry the object. The wiper blade unit in particular has at least one wiper strip. The wiper strip is designed, for example, as a rubber lip or the like. The wiper blade unit comprises at least one holding rail. The wiper strip is preferably arranged on the holding rail, in particular detachably, preferably detachably in a non-destructive manner. The wiper blade unit preferably comprises at least one spring rail or the like, in order to fasten the wiper strip to the holding rail, preferably in a form-fitting manner. It is conceivable that the holding rail has the shape of a wind deflector element. It is conceivable that the wiper blade device comprises a wiper arm adapter via which the wiper blade unit, in particular the holding rail, can be connected to a wiper arm, in particular a wiper blade adapter of the wiper arm, of a windshield wiper.

Preferably, the wiper blade device is provided for use on a vehicle. The vehicle may be designed as a road vehicle, for example a passenger car or a truck or the like, as a rail vehicle, such as a train, a rail car, a streetcar or the like, or as a watercraft, such as a ship, a boat or the like. In addition, it would be conceivable for the vehicle to be designed as a cleaning vehicle, in particular a cleaning robot, for example a wiping robot and/or a robot vacuum cleaner. The wiper blade device is preferably part of a windshield wiper for the vehicle. The windshield wiper is, for example, part of a wiper system for the vehicle. The fluid line is preferably formed in one piece with the holding rail. The term "in one piece" can be understood to mean at least integrally bonded, for example by means of a welding process, an adhesion process, an injection process and/or another process that appears expedient to a person skilled in the art, and/or advantageously molded in one piece, for example by production from a casting and/or by production in a single-component or multi-component injection molding process, and advantageously from a single blank. Alternatively, it is also conceivable for the fluid line to be designed as a separate component, in particular different from the holding rail. An internal cross section of the fluid line is preferably circular. The internal cross section of the fluid line preferably extends in a plane perpendicular to a main extension axis of the fluid line. In this case, the term "main extension axis" of an object can in particular be understood to mean an axis which extends in parallel with a longest edge of a smallest geometric cuboid which just completely encloses the object. Alternatively, it is also conceivable for the internal cross section of the fluid line to have a polygonal shape. An external cross section of the fluid line is preferably circular or polygonal, in particular in the case of the fluid line that is designed separately from the holding rail. The external cross section extends in particular in a plane which extends perpendicularly to the main extension axis of the fluid line. A main extension axis of the holding rail preferably extends at least substantially in parallel with the main extension axis of the fluid line. The term "substantially in parallel" can be understood here to mean an orientation of a direction relative to a reference direction, in particular in a plane, the direction having a deviation in particular of less than 8°, advantageously less than 5°, and particularly advantageously less than 2°, with respect to the reference direction.

The dispensing element is preferably formed differently from the fluid line. Alternatively, it is also conceivable that the dispensing element is formed in one piece with the fluid line, in particular is formed by the fluid line, preferably a dispensing opening at a free end of the fluid line. The dispensing element is designed, for example, as a spray nozzle or as another dispensing element that appears expedient to a person skilled in the art. A main extension axis of the wiper blade unit preferably extends at least substantially in parallel with the main extension axis of the holding rail. It is conceivable that the holding rail has, along its longitudinal extension, at least partially a curved and/or at least partially a straight course. The end surface region is arranged, in particular, at a free end of the wiper blade unit, preferably viewed along a longitudinal extension of the wiper blade unit. The end surface region of the wiper blade unit is preferably formed by a surface bounding the wiper blade unit along its longitudinal extension. It is conceivable that the end surface region is formed by a single surface of the wiper blade unit, which surface is curved at least in portions and/or is flat at least in portions, or is formed by another surface having any structure.

Preferably, the dispensing element is arranged on the surface bounding the wiper blade unit in the longitudinal direction. The dispensing element is preferably arranged at the free end of the fluid line. A fluid dispensing direction of the dispensing element, in particular a main alignment axis of the dispensing opening of the dispensing element, preferably extends in the longitudinal direction of the wiper blade unit. It is conceivable that the fluid dispensing direction of the dispensing element, in particular the main alignment axis of the dispensing opening of the dispensing element, extends at least substantially in parallel with the main extension axis of the holding rail and/or the fluid line. Alternatively, it is also conceivable that the fluid dispensing direction of the dispensing element, in particular the main alignment axis of the dispensing opening of the dispensing element, extends at an angle to the main extension axis of the holding rail and/or the main extension axis of the fluid line. The fluid dispensing direction of the dispensing element corresponds in particular to the main alignment axis of the dispensing opening of the dispensing element.

The embodiment, according to the invention, of the wiper blade device makes it possible to provide a wiper blade unit which enables a cleaning function which can be used particularly flexibly. An object to be cleaned, which is opposite an end surface region of the wiper blade unit, can advantageously be cleaned. Advantageously, cleaning of an object which is opposite an end surface region of the wiper blade unit can be realized in a structurally simple manner.

It is furthermore proposed that the dispensing element is provided to dispense the fluid in the longitudinal direction of the wiper blade unit onto the object, which is different from a vehicle window. The dispensing element is in particular provided to spray in the longitudinal direction of the wiper blade unit. The vehicle in particular comprises the vehicle window. The vehicle window is preferably a front window of the vehicle. Alternatively, it is also conceivable that the vehicle window is designed as a rear window or another vehicle window that appears expedient to a person skilled in the art. In particular, the wiper blade device, in particular the wiper blade unit, is provided for a rotation about an axis of rotation, preferably in order to clean the vehicle window. The dispensing element is preferably provided to dispense the fluid at least substantially radially onto the object, in particular with regard to a rotation of the wiper blade unit about the axis of rotation. The term "substantially radially" can be understood here to mean an orientation of a direction relative to a radial axis, in particular in a plane, the direction having a deviation in particular less than 8°, advantageously less than 5°, and particularly advantageously less than 2°, with respect to the radial axis. Alternatively, it is also conceivable for the dispensing element to be provided to dispense the fluid onto the object along a direction which extends at an angle, in particular different from a right angle, to a radial axis of the rotation of the wiper blade device, in particular the wiper blade unit, about the axis of rotation. It is conceivable that the main extension axis of the wiper blade unit extends at least substantially in parallel or at an angle, preferably different from a right angle, to a radial axis of the rotation of the wiper blade unit about the axis of rotation. A wiper blade device having a cleaning function that can be used particularly flexibly can advantageously be realized. Advantageously, a fluid can be dispensed particularly flexibly and over a large area by means of the wiper blade unit, in particular the dispensing element.

It is also proposed that the dispensing element is provided to dispense the fluid in the longitudinal direction of the wiper blade unit onto the object, which is designed as a lidar device. The lidar device is in particular at least a part, preferably at least a subassembly, at least of a lidar system, in particular a lidar sensor assembly. The lidar device can in particular also comprise the entire lidar system, in particular the entire lidar sensor assembly. The lidar device is provided, for example, on the vehicle for the purpose of detecting the environment, in particular for autonomous driving, on construction sites for measuring buildings, for scanning 3D contours and/or in the laboratory for research purposes. The lidar device comprises at least one lidar sensor element. In particular, the lidar device is provided, specifically in particular by means of the at least one lidar sensor element, for detecting and/or measuring objects. Preferably, the lidar device is provided for use on a vehicle; in particular, the lidar device can be part of the vehicle. It would also be conceivable for the lidar device to be able to be retrofitted on the vehicle. For example, the lidar device could be able to be retrofitted on the vehicle in addition to an already existing lidar system of the vehicle. Preferably, the lidar device, in particular as part of the lidar system, is provided for detecting objects, in particular in the surroundings of the vehicle. In order to detect objects, the lidar device is preferably coupled to the vehicle, preferably in a roof region, a front region and/or a rear region of the vehicle. In particular, the vehicle could have a plurality of lidar devices. The lidar device is preferably arranged on the vehicle at a position different from a vehicle window. Advantageously, the wiper blade device can be used for cleaning a lidar device. Advantageously, a wiper blade device can be provided for simultaneous cleaning of different objects.

It is further proposed that the dispensing element is arranged on an outer circular region of the wiper blade unit. The outer circular region is preferably a region around a movement path of an outermost point of the wiper blade unit, which movement path can be produced in particular by a rotation of the wiper blade device, preferably of the wiper blade unit, for example during a wiping movement, about the axis of rotation. A maximum extension of the outer circle region of the wiper blade unit along the radial axis starting from the movement path of the outermost point of the wiper blade unit with regard to a rotation of the wiper blade unit about the axis of rotation, preferably during a wiping movement of the wiper blade unit, is preferably at most 20%, preferably at most 10%, and particularly preferably at most 5%, of a distance of the outermost point of the wiper blade unit from the axis of rotation. Advantageously, a fluid can be dispensed particularly broadly.

Furthermore, it is proposed that the dispensing element is provided to dispense the fluid outward, in the longitudinal direction of the wiper blade unit. In the longitudinal direction of the wiper blade unit, the dispensing element preferably sprays outward onto the object to be cleaned. It is conceivable that the dispensing element is provided to dispense the fluid at least substantially radially outward. Advantageously, a fluid can be dispensed particularly broadly.

It is furthermore proposed that the wiper blade unit comprises an end cap on which the dispensing element is arranged. The end cap is preferably fastened to the holding rail, in particular releasably, preferably releasably in a non-destructive manner. The end cap preferably closes the wiper blade unit at the free end of the wiper blade unit along the longitudinal extension of the wiper blade unit. In particular, the end cap has a surface which forms the surface bounding the wiper blade unit along its longitudinal extension. The end surface region is in particular arranged on the end cap. Advantageously, the dispensing element can be checked particularly comfortably in a state in which the end cap is released from the holding rail. Advantageously, the dispensing element can be replaced particularly comfortably, for example in the event of damage or the like. Advantageously, a commercially available windshield wiper having a fluid line can be retrofitted with the end cap in order to achieve an enhanced cleaning function.

It is also proposed that the wiper blade device comprises a fluid dispensing control unit, which is provided to release or block dispensing of the fluid onto the object depending on a rotational position of the wiper blade unit. It is conceivable that the fluid dispensing control unit is designed to be purely mechanical or at least partially electrical. For example, it is conceivable that the fluid dispensing control unit has at least one control or regulating unit for controlling or regulating a dispensing of fluid by the dispensing element. The control or regulating unit comprises in particular at least one processor and a memory element, and an operating program stored in the memory element. The memory element is preferably designed as a digital storage medium, for example as a hard drive or the like. It is conceivable that the control or regulating unit of the fluid dispensing control unit is formed by a control or regulating unit of a wiper system, in particular of the windshield wiper that comprises the wiper blade device. It is conceivable that the wiper blade unit comprises a closure element, for example a closure cap, a valve, in particular a check valve, or the like, which releases or blocks the dispensing of the fluid onto the object depending on a rotational position of the wiper blade unit. The closure element is provided to block the fluid or allow it to pass through, in at least one operating state. It is conceivable that blocking and release of dispensing of the fluid by the dispensing element is controlled purely mechanically by means of the closure element or is controlled by the control or regulating unit. It is conceivable that the closure element is arranged on the dispensing element, for example on the dispensing opening of the dispensing element. It is also conceivable for the closure element to be arranged on the fluid line or at another position for the closure element that appears expedient to a person skilled in the art. It is conceivable that the wiper system, in particular the windshield wiper or the wiper blade device, has a sensor for determining a rotational position of the wiper blade unit, the fluid dispensing control unit controlling or regulating the dispensing of the fluid, in particular depending on a sensor signal of the sensor. Alternatively or additionally, it is also conceivable that a user can manually block or release dispensing of fluid via the dispensing element, in particular by means of the closure element. Furthermore, it is also conceivable for the lidar device to comprise at least one further sensor for detecting contamination of the lidar device. It is conceivable that dispensing of the fluid via the dispensing element is controlled or regulated, for example by means of the fluid dispensing control unit, depending on a sensor signal detected by means of the further sensor. Advantageously, a targeted cleaning of the object can be achieved. Undesired dispensing of a fluid via the dispensing element can advantageously be counteracted particularly easily and effectively. Particularly fluid-saving cleaning of the object can advantageously be achieved.

It is further proposed that the wiper blade unit comprises at least one further fluid line, in particular different from the fluid line, for conducting a fluid, and at least one further dispensing element for dispensing the fluid onto a further object to be cleaned, in particular a vehicle window, preferably the one already mentioned above. The further fluid line is preferably designed in the manner of a tube, hose or the like. The further fluid line is formed, for example, in one piece with the holding rail or is formed as a separate component, in particular different from the holding rail. An internal cross section of the further fluid line is preferably circular. The internal cross section of the further fluid line preferably extends in a plane perpendicular to a main extension axis of the further fluid line. Alternatively, it is also conceivable that the internal cross section of the further fluid line has a polygonal shape. An external cross section of the further fluid line is preferably circular or polygonal, in particular in the case of the further fluid line formed separately from the holding rail. The external cross section extends in particular in a plane which extends perpendicularly to the main extension axis of the further fluid line. The main extension axis of the further fluid line preferably extends at least substantially in parallel with the main extension axis of the fluid line and/or the main extension axis of the holding rail. The at least one further dispensing element preferably has at least one dispensing opening which is oriented transversely, preferably at least substantially perpendicularly, to the longitudinal extension of the wiper blade unit, in particular the main extension axis of the holding rail and/or the further fluid line. The dispensing opening of the at least one further dispensing element is preferably oriented transversely, preferably at least substantially perpendicularly, to the dispensing opening of the at least one dispensing element. It is conceivable that the at least one further dispensing element is formed in one piece with the further fluid line or is formed differently from the further fluid line. It is conceivable, for example, for the further dispensing element to be formed by a recess, preferably in a lateral surface, of the further fluid line. Alternatively, it is also conceivable that the further dispensing element is designed as a spray nozzle or as another dispensing element that appears expedient to a person skilled in the art. Alternatively, it is also conceivable for the wiper blade unit to have only the fluid line, wherein the fluid line in particular transports the fluid to the dispensing element and the further dispensing element. Advantageously, cleaning of an object and of a further object can take place independently of one another by means of the wiper blade device. Advantageously, a particularly flexible wiper blade device can be provided which enables targeted and efficient cleaning of objects that are different from one another.

Furthermore, it is proposed that the dispensing element be arranged adjustably on the end surface region of the wiper blade unit. It is conceivable that the fluid dispensing direction of the dispensing element, and thus in particular the main alignment axis of the dispensing opening of the dispensing element, a dispensing pressure, in particular a spray pressure, a dispensing pattern, in particular a spray pattern, a dispensing angular range, in particular a spray angular range, or the like, of the dispensing element can be adjusted. It is conceivable for the dispensing element to be adjustable manually by a user, preferably during assembly, or to be adjustable via the control or regulating unit. For example, the dispensing element is designed to be rotatable for an adjustment and/or has an operating element, for example a slide control, a button or the like. Advantageously, the wiper blade unit, in particular the dispensing element, can be adapted particularly easily and in a targeted manner to different requirements for cleaning the object to be cleaned. A particularly flexibly usable and efficient wiper blade device can advantageously be provided for cleaning a lidar device.

Furthermore, a windshield wiper comprising a wiper blade device according to the invention is proposed, in particular the windshield wiper already mentioned above. Advantageously, a windshield wiper can be provided, by means of which an object spaced apart from a vehicle window can be cleaned in a targeted manner.

It is also proposed that the windshield wiper comprises a wiper arm on which the wiper blade device is arranged, the wiper arm comprising at least two supply lines for conducting a fluid to the fluid line and a further fluid line of the wiper blade unit, in particular the further fluid line already mentioned above. Preferably, one supply line of the at least two supply lines is fluidically connected to the fluid line. Preferably, a further supply line of the at least two supply lines is fluidically connected to the further fluid line. Alternatively, it is also conceivable for the wiper arm to have only one supply line for the fluid line and the further fluid line. Preferably, the wiper system, in particular the windshield wiper, comprises a fluid pump and/or a compressor in order to dispense the fluid via the dispensing element and/or the at least one further dispensing element. It is conceivable that the fluid pump is designed as a high-pressure pump. In particular, the fluid pump and/or the compressor transports the fluid through the at least two supply lines, the fluid line and/or the further fluid line. It is further conceivable that the fluid dispensing control unit, in particular the control or regulating unit, releases or blocks the dispensing of fluid by controlling or regulating the compressor and/or the fluid pump. Furthermore, it is also conceivable that the compressor is arranged on the fluid line, and in particular on the supply line for the fluid line, for the purpose of transporting air and, on the further fluid line, and in particular on the further supply line for the further fluid line, the fluid pump is arranged for the purpose of transporting a cleaning liquid, for example water or the like. Advantageously, a particularly flexible and simultaneously reliable cleaning function of the windshield wiper can be realized.

Furthermore proposed is a vehicle, in particular the one already mentioned above, which comprises a wiper blade device according to the invention and the object and is designed as a lidar device, in particular the one already mentioned above. Preferably, the windshield wiper comprising the wiper blade device is arranged on the vehicle. It is also conceivable for the wiper system to be arranged on the vehicle. The wiper system preferably comprises at least the windshield wiper and/or a further windshield wiper. The further windshield wiper is preferably designed to be free of a wiper blade device according to the invention. Alternatively, it is also conceivable for the further windshield wiper to comprise a wiper blade device according to the invention. Preferably, the lidar device is connected to the vehicle. Preferably, the lidar device is arranged at least partially on an outer side of the vehicle. The lidar device is arranged, for example, on a vehicle roof of the vehicle, on a front region of the vehicle, in particular on an engine hood of the vehicle, or at another position of the vehicle that appears expedient to a person skilled in the art. It is conceivable that the lidar device is integrated into the vehicle, in particular the vehicle roof. It is also conceivable for the lidar device to be arranged detachably, preferably detachably in a non-destructive manner, on the vehicle, in particular the vehicle roof. Advantageously, a vehicle comprising a particularly reliable environment detection can be provided.

Furthermore, the invention proceeds from a method for operating a wiper blade device, in particular a wiper blade device according to the invention. It is proposed that, during a cleaning process, a fluid is applied to a lidar device via a dispensing element of the wiper blade device. Preferably, the wiper blade device, in particular the windshield wiper, is rotated about the axis of rotation, preferably in a cleaning process. Preferably, the wiper blade device is driven by means of a drive unit, for example an electric motor or the like, to perform a rotation about the axis of rotation, preferably a wiping movement. It is conceivable that the wiper system, in particular the windshield wiper or the wiper blade device, comprises the drive unit. The wiper blade device is in particular moved, preferably by means of the drive unit, across the vehicle window in order to clean the vehicle window. In particular, for cleaning the vehicle window, the wiper blade device is moved back and forth, preferably rotated, in a maximum angular range between two end points. The maximum angular range is preferably less than 180° and greater than 90°. Alternatively, another maximum angular range that appears expedient to a person skilled in the art is also conceivable for the rotation of the wiper blade device. Preferably, during the wiping movement, in particular over at least substantially the entire maximum angular range, a fluid is dispensed via the at least one further dispensing element, preferably onto the vehicle window.

When a fluid is dispensed over at least substantially the entire maximum angular range, the fluid is dispensed in particular in at least 75% of the angular range, preferably in at least 90%, and particularly preferably in at least 95%, of the entire maximum angular range. Alternatively, it is also conceivable that a fluid is dispensed only in portions via the at least one further dispensing element during the wiping movement, or that no fluid is dispensed over at least substantially the entire maximum angular range. A fluid is preferably dispensed via the dispensing element only in a subrange of the maximum angular range. Alternatively, it is also conceivable that a fluid is dispensed via the dispensing element at least substantially in the entire maximum angular range. In the subrange of the maximum angular range in which a fluid is dispensed in particular via the dispensing element, a fluid dispensing direction of the dispensing element, preferably the main alignment axis of the dispensing opening of the dispensing element, preferably intersects the lidar device.

The wiper blade device according to the invention, the windshield wiper according to the invention, the vehicle according to the invention and/or the method according to the invention should not be limited to the application and embodiment described above. In particular, in order to fulfill a functionality described herein, the wiper blade device according to the invention, the windshield wiper according to the invention, the vehicle according to the invention and/or the method according to the invention can have a number of individual elements, components and units, as well as method steps, that deviates from the number mentioned herein. In addition, in the case of the value ranges specified in this disclosure, values within the mentioned limits are also to be considered as disclosed and usable as desired.

BRIEF DESCRIPTION OF THE DRAWINGS

Further advantages result from the following description of the drawings. Two exemplary embodiments of the invention are illustrated in the drawing. The drawing, the description and the claims contain numerous features in combination. A person skilled in the art will expediently also consider the features individually and combine them to form meaningful further combinations.

In the drawings.

DETAILED DESCRIPTION

Figure 1:
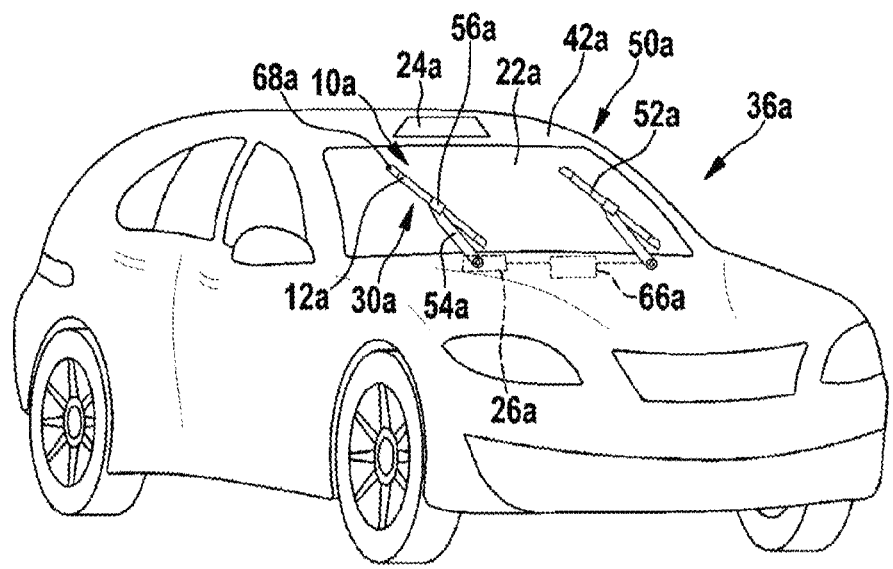
FIG. 1 is a simplified perspective view of a vehicle according to the invention comprising a lidar device and a windshield wiper according to the invention.

FIG. 1 shows a vehicle 36a. The vehicle 36a is designed as a road vehicle, in particular as a passenger car. Alternatively, it is also conceivable for the vehicle 36a to be designed as a truck or the like, as a rail vehicle, such as a train, a rail car, a streetcar or the like, or as a watercraft, such as a ship, a boat or the like. In addition, it would be conceivable for the vehicle 36a to be designed as a cleaning vehicle, in particular a cleaning robot, for example as a wiping robot and/or as a robot vacuum cleaner.

The vehicle 36a comprises an object designed as a lidar device 24a. The lidar device 24a is connected to the vehicle 36a. The lidar device 24a is arranged at least partially on an outer side of the vehicle 36a. The lidar device 24a is arranged on the vehicle 36a at a position different from a vehicle window 22a of the vehicle 36a. The lidar device 24a is arranged on a vehicle roof 42a of the vehicle 36a. Alternatively, it is also conceivable for the lidar device 24a to be arranged at another position of the vehicle 36a that appears expedient to a person skilled in the art. The lidar device 24a is integrated into the vehicle 36a, in particular the vehicle roof 42a. Alternatively, it is conceivable that the lidar device 24a is arranged detachably, preferably detachably in a non-destructive manner, on the vehicle 36a, in particular the vehicle roof 42a.

The lidar device 24a is provided for detecting the environment, in particular for autonomous driving. The lidar device 24a comprises, for example, at least one lidar sensor element (not shown here). The lidar device 24a is provided, specifically in particular by means of the at least one lidar sensor element, for detecting and/or measuring objects, in particular in an environment of the vehicle 36a.

The vehicle 36a comprises a wiper system 50a comprising a windshield wiper 30a and a further windshield wiper 52a. The windshield wiper 30a comprises a wiper blade device 10a. The wiper blade device 10a comprises at least one wiper blade unit 12a. The wiper blade unit 12a has at least one wiper strip 44a. The wiper strip 44a is designed as a rubber lip. Alternatively, it is also conceivable that the wiper strip 44a is designed as a wiper strip 44a that is different from a rubber lip and appears expedient to a person skilled in the art. The wiper blade unit 12a comprises at least one holding rail 46a. The wiper strip 44a is arranged, preferably detachably, in particular detachably in a non-destructive manner, on the holding rail 46a. The wiper blade unit 12a comprises two spring rails 48a in order to fasten the wiper strip 44a to the holding rail 46a, preferably in a form-fitting manner. The holding rail 46a has the shape of a wind deflector element. The windshield wiper 30a comprises at least one wiper arm 54a comprising a wiper blade adapter 56a. The wiper blade device 10a is arranged on the wiper arm 54a. The wiper arm 54a is connected via the wiper blade adapter 56a to the wiper blade device 10a, in particular the wiper blade unit 12a.

The wiper system 50a comprises a drive unit 66a. The drive unit 66a drives the windshield wiper 30a, in particular the wiper blade device 10a, and/or the further windshield wiper 52a to perform a movement, preferably a rotation about a respective axis of rotation. The drive unit 66a is designed as an electric motor or the like. The drive unit 66a drives the windshield wiper 30a, in particular the wiper blade device 10a, and/or the further windshield wiper 52a to perform a movement across the vehicle window 22a in order to clean the vehicle window 22a.

Figure 4:
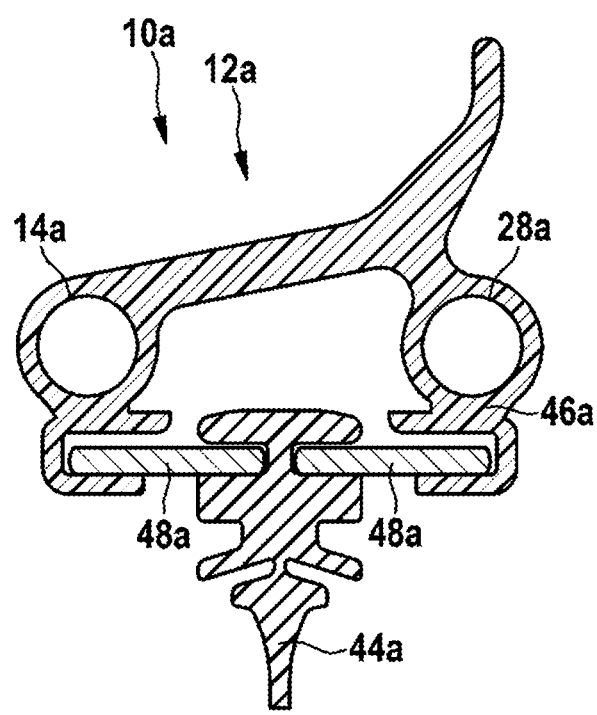
FIG. 4 is a cross-sectional view of a part of the wiper blade device according to the invention.

The wiper blade unit 12a comprises at least one fluid line 14a for conducting a fluid (cf. FIG. 4). The wiper blade unit 12a comprises at least one dispensing element 16a for dispensing the fluid onto an object to be cleaned. The dispensing element 16a is provided to dispense a fluid conducted through the fluid line 14a. The fluid is a cleaning liquid, for example water or the like. Alternatively, it is also conceivable for the fluid to be air. The fluid line 14a is designed in the manner of a tube, hose or the like. The dispensing element 16a is provided to dispense the fluid in the longitudinal direction of the wiper blade unit 12a onto the object to be cleaned, which is different from the vehicle window 22a of the vehicle 36a. The dispensing element 16a is provided to dispense the fluid in the longitudinal direction of the wiper blade unit 12a onto the object which is designed as the lidar device 24a. The dispensing element 16a is provided for spraying in the longitudinal direction of the wiper blade unit 12a. The vehicle window 22a is a front window of the vehicle 36a. Alternatively, it is also conceivable for the vehicle window 22a to be a rear window or another vehicle window 22a that appears expedient to a person skilled in the art.

The fluid line 14a is formed in one piece with the holding rail 46a. Alternatively, it is also conceivable for the fluid line 14a to be designed as a separate component, in particular different from the holding rail 46a. An internal cross section of the fluid line 14a is circular. The internal cross section of the fluid line 14a extends in a plane perpendicular to a main extension axis of the fluid line 14a. Alternatively, it is also conceivable that the internal cross section of the fluid line 14a has a polygonal shape. A main extension axis 60a of the holding rail 46a extends at least substantially in parallel with the main extension axis of the fluid line 14a.

The wiper blade unit 12a comprises at least one further fluid line 28a, in particular different from the fluid line 14a, for conducting a fluid. The wiper blade unit 12a comprises a plurality of further dispensing elements (not shown here) for dispensing the fluid onto a further object to be cleaned, in particular the vehicle window 22a. The fluid conducted via the further fluid line 28a is preferably a cleaning liquid, for example water. Alternatively, it is also conceivable for the wiper blade unit 12a to have only a further dispensing element for dispensing the fluid to the further object, in particular the vehicle window 22a.

The further fluid line 28a is designed in the manner of a tube, hose or the like. The further fluid line 28a is formed in one piece with the holding rail 46a. Alternatively, it is conceivable that the further fluid line 28a is designed as a separate component, in particular different from the holding rail 46a. An internal cross section of the further fluid line 28a is of circular design. The internal cross section of the further fluid line 28a extends in a plane perpendicular to a main extension axis of the further fluid line 28a. Alternatively, it is also conceivable that the internal cross section of the further fluid line 28a has a polygonal shape. The main extension axis of the further fluid line 28a extends at least substantially in parallel with the main extension axis of the fluid line 14a and/or the main extension axis 60a of the holding rail 46a.

The wiper arm 54a comprises at least two supply lines 32a, 34a for conducting the fluid to the fluid line 14a and the further fluid line 28a of the wiper blade unit 12a. One supply line 32a of the at least two supply lines 32a, 34a is fluidically connected to the fluid line 14a. A further supply line 34a of the at least two supply lines 32a, 34a is fluidically connected to the further fluid line 28a. Alternatively, it is also conceivable for the wiper arm 54a to comprise only one supply line 32a for the fluid line 14a and the further fluid line 14a. The wiper system 50a, in particular the windshield wiper 30a, comprises a fluid pump or the like in order to dispense the fluid via the dispensing element 16a and the plurality of further dispensing elements. The fluid pump transports the fluid through the at least two supply lines 32a. 34a, the fluid line 14a and/or the further fluid line 28a.

Alternatively, it is conceivable, in particular when air is used as the fluid, that the wiper system 50a, in particular the windshield wiper 30a, has a compressor. Furthermore, it is alternatively conceivable that a compressor for transporting air is arranged on the fluid line 14a, and in particular on the supply line 32a for the fluid line 14a, and a fluid pump for transporting a cleaning liquid, for example water or the like, is arranged on the further fluid line 28a, and in particular on the further supply line 34a for the further fluid line 28a.

The wiper arm 54a has at least one cable 70a for electrically connecting an electrical energy source (not shown here) to a heating unit (not shown here) of the windshield wiper 30a, in particular of the wiper blade device 10a. The heating unit is, for example, arranged at least partially on the wiper arm 54a and/or at least partially on the wiper blade device 10a. The heating unit comprises in particular at least one heating element. The heating element can be designed as a heating wire or the like. The heating unit is preferably provided to heat the wiper blade device 10a and/or the wiper arm 54a, in particular the two supply lines 32a, 34a, the fluid line 14a and/or the further fluid line 28a, and thus in particular the fluid. It is also conceivable for the windshield wiper 30a, in particular the wiper blade device 10a, to be formed free of a heating unit and/or the cable 70a.

The further dispensing elements each have at least one dispensing opening which is oriented transversely, preferably at least substantially perpendicularly, to the longitudinal extension of the wiper blade unit 12a, in particular the main extension axis 60a of the holding rail 46a and/or the main extension axis of the further fluid line 28a. The dispensing openings of the plurality of further dispensing elements are oriented transversely, preferably at least substantially perpendicularly, to the dispensing opening 18a of the dispensing element 16a. It is conceivable that the plurality of further dispensing elements are formed in one piece with the further fluid line 28a or are formed differently from the further fluid line 28a. It is conceivable, for example, that the plurality of further dispensing elements are each formed by a recess, preferably in a lateral surface, of the further fluid line 28a. Alternatively, it is also conceivable that the plurality of further dispensing elements are each designed as a spray nozzle or the like.

The dispensing element 16a is designed differently from the fluid line 14a. Alternatively, it is also conceivable that the dispensing element 16a is formed in one piece with the fluid line 14a, in particular is formed by the fluid line 14a, preferably a dispensing opening at a free end of the fluid line 14a. The dispensing element 16a is designed as a spray nozzle. Alternatively, it is also conceivable for the dispensing element 16a to be designed as another dispensing element 16a that appears expedient to a person skilled in the art. A main extension axis 58a of the wiper blade unit 12a extends at least substantially in parallel with the main extension axis 60a of the holding rail 46a. Along its longitudinal extension, the holding rail 46a has at least partially a curved and/or at least partially a straight course.

Figure 2:
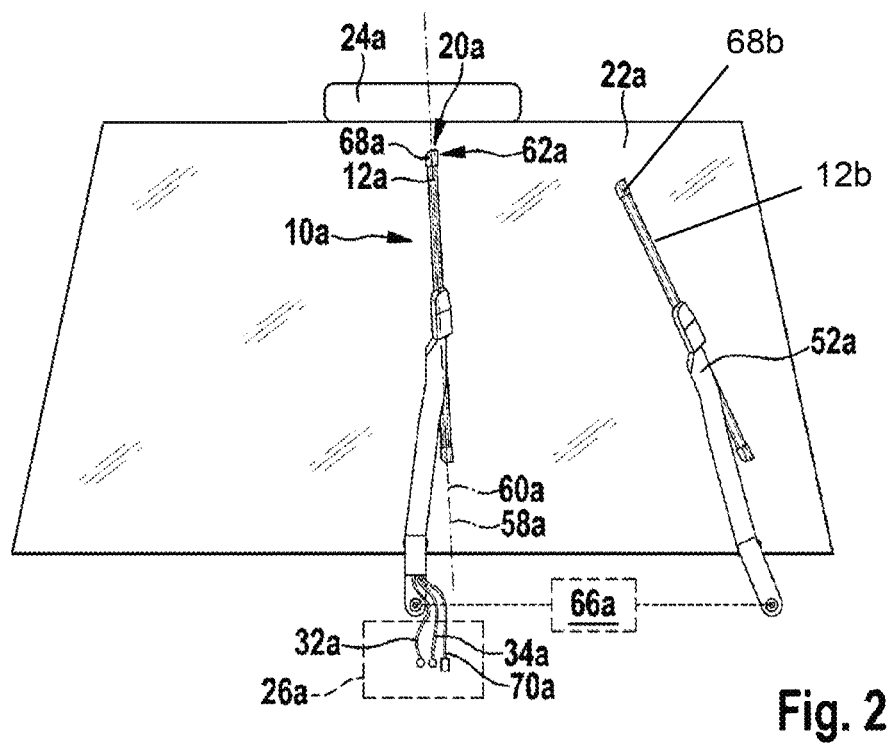
FIG. 2 is a schematic front view of a part of the vehicle according to the invention comprising the windshield wiper according to the invention.
Figure 3:
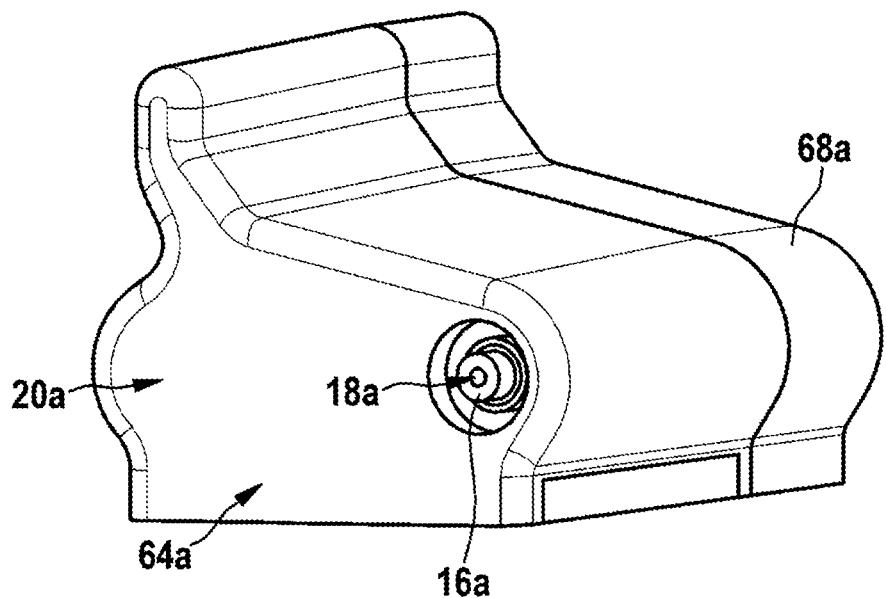
FIG. 3 is a perspective view of an end cap of a wiper blade device according to the invention of the windshield wiper according to the invention.

The dispensing element 16a has at least one dispensing opening 18a. The dispensing opening 18a is arranged on an end surface region 20a of the wiper blade unit 12a (cf. FIGS. 2 and 3). The end surface region 20a is arranged at a free end 62a of the wiper blade unit 12a, preferably viewed along a longitudinal extension of the wiper blade unit 12a. The end surface region 20a of the wiper blade unit 12a is formed by a surface 64a bounding the wiper blade unit 12a along its longitudinal extension. The surface 64a forming the end surface region 20a of the wiper blade unit 12a is designed, for example, as a single surface which is curved at least in portions and/or is flat at least in portions or has any other structure. The dispensing element 16a is arranged on the surface 64a bounding the wiper blade unit 12a in the longitudinal direction. The dispensing element 16a is arranged at the free end of the fluid line 14a. A fluid dispensing direction of the dispensing element 16a, in particular a main alignment axis of the dispensing opening 18a of the dispensing element 16a, extends in the longitudinal direction of the wiper blade unit 12a, in particular in the longitudinal direction of the holding rail 46a and/or of the fluid line 14a. It is conceivable that the fluid dispensing direction of the dispensing element 16a, in particular the main alignment axis of the dispensing opening 18a of the dispensing element 16a, extends at least substantially in parallel with the main extension axis 60a of the holding rail 46a and/or the main extension axis of the fluid line 14a. Alternatively, it is also conceivable that the fluid dispensing direction of the dispensing element 16a, in particular the main alignment axis of the dispensing opening 18a of the dispensing element 16a, extends at an angle to the main extension axis 60a of the holding rail 46a and/or the main extension axis of the fluid line 14a. The fluid dispensing direction of the dispensing element 16a corresponds to the main alignment axis of the dispensing opening 18a of the dispensing element 16a.

The further windshield wiper 52a is formed free of a dispensing element having a dispensing opening which is arranged on an end surface region of a wiper blade unit of the further windshield wiper 52a. Alternatively, it is also conceivable that the further windshield wiper 52a comprises a dispensing element having a dispensing opening which is arranged on the end surface region of the wiper blade unit of the further windshield wiper 52a.

The wiper blade device 10a, in particular the wiper blade unit 12a, is provided for a rotation about the axis of rotation in order to clean the vehicle window 22a. The dispensing element 16a is provided to dispense the fluid at least substantially radially onto the object, in particular with regard to a rotation of the wiper blade unit 12a about the axis of rotation. Alternatively, it is also conceivable for the dispensing element 16a to be provided for dispensing the fluid onto the object along a direction which extends at an angle, in particular different from a right angle, to a radial axis of the rotation of the wiper blade device 10a, in particular of the wiper blade unit 12a, about the axis of rotation. The main extension axis 58a of the wiper blade unit 12a extends at least substantially in parallel with the radial axis of the rotation of the wiper blade unit 12a about the axis of rotation. Alternatively, it is also conceivable for the main extension axis 58a of the wiper blade unit 12a to extend at an angle, preferably different from a right angle, to a radial axis of the rotation of the wiper blade unit 12a about the axis of rotation. The dispensing element 16a is provided to dispense the fluid outward in the longitudinal direction of the wiper blade unit 12a. The dispensing element 16a sprays outward in the longitudinal direction of the wiper blade unit 12a onto the object to be cleaned. It is conceivable that the dispensing element 16a is provided to dispense the fluid at least substantially radially outward.

The dispensing element 16a is arranged on an outer circular region of the wiper blade unit 12a. The outer circular region is a region around a movement path of an outermost point of the wiper blade unit 12a that can be produced in particular by a rotation of the wiper blade device 10a, in particular of the wiper blade unit 12a, for example during a wiping movement. A maximum extension of the outer circular region of the wiper blade unit 12a along the radial axis starting from the movement path of the outermost point of the wiper blade unit 12a is preferably at most 20%, preferably at most 10%, and particularly preferably at most 5%, of a distance of the outermost point of the wiper blade unit 12a to the axis of rotation.

The wiper blade unit 12a comprises an end cap 68a, on which the dispensing element 16a is arranged. The end cap 68a is fastened to the holding rail 46a, in particular detachably, preferably detachably in a non-destructive manner. The end cap 68a closes the wiper blade unit 12a at the free end 62a of the wiper blade unit 12a, along the longitudinal extension of the wiper blade unit 12a. The end cap 68a has a surface which forms the surface 64a bounding the wiper blade unit 12a along its longitudinal extension. The end surface region 20a is arranged on the end cap 68a.

The wiper blade device 10a comprises a fluid dispensing control unit 26a, which is provided to release or block dispensing of the fluid onto the object depending on a rotational position of the wiper blade unit 12a. It is conceivable that the fluid dispensing control unit 26a is designed to be purely mechanical or at least partially electrical. For example, it is conceivable that the fluid dispensing control unit 26a has at least one control or regulating unit (not shown here) for controlling or regulating a dispensing of fluid by the dispensing element 16a. The control or regulating unit comprises at least one processor and a memory element, as well as an operating program stored on the memory element. The memory element is preferably designed as a digital storage medium, for example as a hard drive or the like. It is conceivable that the control or regulating unit of the fluid dispensing control unit 26a is formed by a control or regulating unit of the wiper system 50a.

It is conceivable that the fluid dispensing control unit 26a comprises a closure element (not shown here). The closure element is designed, for example, as a closure cap, as a valve or the like. The closure element releases dispensing of the fluid via the dispensing element 16a onto the object or blocks dispensing of the fluid via the dispensing element 16a onto the object, depending on a rotational position of the wiper blade unit 12a. The closure element is provided to block the fluid or allow it to pass through, in at least one operating state. It is conceivable that blocking and release of dispensing of the fluid by the dispensing element 16a is controlled purely mechanically by means of the closure element or is controlled by means of the control or regulating unit. It is conceivable that the closure element is arranged on the dispensing element 16a, for example on the dispensing opening 18a of the dispensing element 16a. It is also conceivable for the closure element to be arranged on the fluid line 14a or at another position for the closure element that appears expedient to a person skilled in the art. It is also conceivable that the wiper system 50a, in particular the windshield wiper 30a or the wiper blade device 10a, has a sensor for determining a rotational position of the wiper blade unit 12a, the fluid dispensing control unit 26a controlling or regulating the dispensing of the fluid via the dispensing element 16a in particular depending on a sensor signal of the sensor. Alternatively or additionally, it is also conceivable that a user can manually block or release dispensing of fluid via the dispensing element 16a, in particular by means of the closure element. Alternatively or additionally, it is also conceivable that the fluid dispensing control unit 26a, in particular the control or regulating unit, releases or blocks the dispensing of fluid by controlling or regulating the fluid pump.

The dispensing element 16a is adjustably arranged on the end surface region 20a of the wiper blade unit 12a. It is conceivable that the fluid dispensing direction of the dispensing element 16a, and thus in particular the main alignment axis of the dispensing opening 18a of the dispensing element 16a, can adjust a dispensing pressure, in particular a spray pressure, a dispensing pattern, in particular a spray pattern, a dispensing angular range, in particular a spray angular range, or the like, of the dispensing element 16a. It is conceivable that the dispensing element 16a can be adjusted manually by a user or can be adjusted via the control or regulating unit. For example, for the purpose of adjustment, the dispensing element 16a is designed to be rotatable and/or has an operating element (not shown here), for example a slide control, a button or the like.

Figure 5:
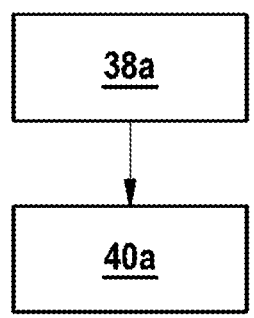
FIG. 5 shows a schematic sequence of a method according to the invention for operating the wiper blade device according to the invention.

FIG. 5 shows a schematic sequence of a method for operating the wiper blade device 10a. The wiper blade device 10a, in particular the windshield wiper 30a, is rotated about the axis of rotation in a cleaning process. Preferably, the wiper blade device 10a is driven by means of the drive unit 66a to perform a rotation about the axis of rotation, preferably a wiping movement. The wiper blade device 10a is moved, preferably by means of the drive unit 66a, across the vehicle window 22a to perform cleaning of the vehicle window 22a, in particular in a method step 38a. For cleaning the vehicle window 22a, the wiper blade device 10a is moved back and forth, preferably rotated, in a maximum angular range between two end points. The maximum angular range is, for example, less than 180° and greater than 90°. Alternatively, another maximum angular range that appears expedient to a person skilled in the art is also conceivable for the rotation of the wiper blade device 10a. During the wiping movement, in particular over at least substantially the entire maximum angular range, a fluid is dispensed via the plurality of further dispensing elements onto the vehicle window 22a, preferably in the method step 38a. Alternatively, it is also conceivable that a fluid is dispensed only in portions via the plurality of further dispensing elements during the wiping movement, or that no fluid is dispensed over at least substantially the entire maximum angular range. Only in a subrange of the maximum angular range is a fluid dispensed via the dispensing element 16a, preferably in a further method step 40a. During a cleaning process, the fluid is applied to the lidar device 24a via the dispensing element 16a of the wiper blade device 10a, in particular in the further method step 40a. Alternatively, it is also conceivable that a fluid is dispensed via the dispensing element 16a at least substantially in the entire maximum angular range. The fluid dispensing direction of the dispensing element 16a, preferably the main alignment axis of the dispensing opening 18a of the dispensing element 16a, intersects the lidar device 24a in the subrange of the maximum angular range in which a fluid is dispensed in particular via the dispensing element 16a.

Figure 6:
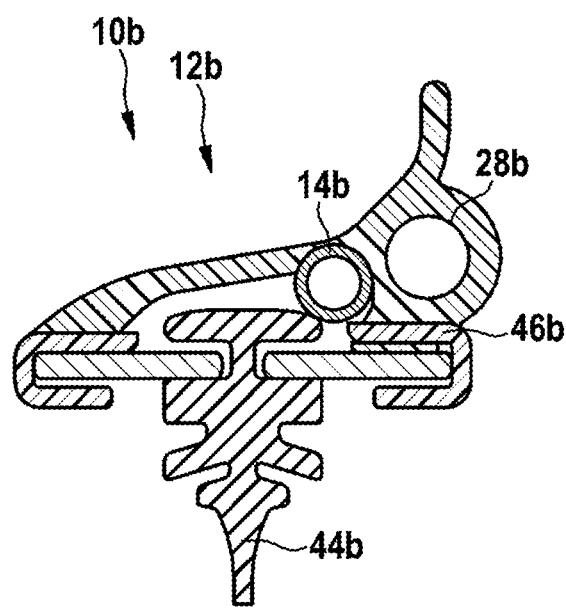
FIG. 6 is a cross-sectional view of a part of a wiper blade device according to the invention in an alternative embodiment.

FIG. 6 shows a further exemplary embodiment of the invention. The following descriptions and the drawings are substantially limited to the differences between the exemplary embodiments, wherein reference can basically also be made to the drawings and/or the description of the other exemplary embodiments, in particular of FIGS. 1 to 5, with respect to identically designated components, in particular with respect to components having the same reference signs. In order to distinguish the exemplary embodiments, the letter a is added to the reference signs of the exemplary embodiment in FIGS. 1 to 5. In the exemplary embodiment of FIG. 6, the letter a is replaced by the letter b.

FIG. 6 shows a part of a wiper blade device 10*b*. The wiper blade device 10*b* comprises at least one wiper blade unit 12*b*. The wiper blade unit 12*b* comprises a wiper strip 44*b* and a holding rail 46*b* on which the wiper strip 44*b* is arranged. The wiper blade unit 12*b* comprises at least one fluid line 14*b* and a further fluid line 28*b*. The fluid line 14*b* is designed as a separate component, in particular different from the holding rail 46*b*. An external cross section of the fluid line 14*b* is circular. Alternatively, it is also conceivable that the external cross section of the fluid line 14*b* is polygonal. The external cross section extends in a plane which extends perpendicularly to a main extension axis of the fluid line 14*b*.

What is claimed is:

1. A wiper blade device (10*a*; 10*b*) comprising a wiper blade unit (12*a*; 12*b*), which includes a first fluid line (14*a*; 14*b*) for conducting a first fluid and a dispensing element (16*a*) for dispensing the first fluid onto a first object to be cleaned located off of a windshield located on a vehicle, characterized in that the dispensing element (16*a*) has a dispensing opening (18*a*) which is arranged on an end surface region (20*a*; 20*b*) of the wiper blade unit (12*a*; 12*b*), wherein the dispensing element (16*a*) is provided to dispense the first fluid in a longitudinal direction of the wiper blade unit (12*a*; 12*b*) onto the first object, wherein the wiper blade device (10*a*; 10*b*) further includes a second fluid line (28*a*; 28*b*) for conducting a second fluid onto a second object to be cleaned, wherein the first object is different than the second object, and the second object is the windshield located on the vehicle.

2. The wiper blade device (10*a*; 10*b*) according to claim 1, characterized in that the first object is a lidar device (24*a*; 24*b*) located off of the windshield.

3. The wiper blade device (10*a*; 10*b*) according to claim 1, characterized in that the dispensing element (16*a*) is arranged on an outer circular region of the wiper blade unit (12*a*; 12*b*).

4. The wiper blade device (10*a*; 10*b*) according to claim 1, characterized in that the wiper blade unit (12*a*; 12*b*) comprises an end cap (68*a*) on which the dispensing element (16*a*) is arranged, wherein the end cap (68*a*) includes the end surface region (20*a*, 20*b*), and wherein the end surface region (20*a*, 20*b*) faces along the longitudinal direction.

5. The wiper blade device (10*a*; 10*b*) according to claim 1, characterized by a fluid dispensing control unit (26*a*) provided to release or block dispensing of the first fluid onto the first object depending on a rotational position of the wiper blade unit (12*a*; 12*b*).

6. The wiper blade device (10*a*; 10*b*) according to claim 1, characterized in that the dispensing element (16*a*) is arranged adjustably on the end surface region (20*a*; 20*b*) of the wiper blade unit (12*a*; 12*b*).

7. A windshield wiper (30*a*; 30*b*) comprising a wiper blade device (10*a*; 10*b*) according to claim 1.

8. The windshield wiper (30*a*; 30*b*) according to claim 7, characterized by a wiper arm (54*a*; 54*b*) on which the wiper blade device (10*a*; 10*b*) is arranged, the wiper arm (54*a*; 54*b*) comprising at least two supply lines (32*a*, 34*a*; 32*b*, 34*b*) for conducting the first fluid and the second fluid.

9. A vehicle (36*a*; 36*b*) comprising a wiper blade device (10*a*; 10*b*) according to claim 1, wherein the first object is a lidar device (24*a*; 24*b*) located on the vehicle and the second object is the windshield located on the vehicle.

10. A method for operating a wiper blade device (10*a*; 10*b*) according to claim 1, characterized in that the first object is a lidar device (24*a*; 24*b*), and during a cleaning process, the first fluid is applied to the lidar device (24*a*; 24*b*) via the dispensing element (16*a*) of the wiper blade device (10*a*; 10*b*).

* * * * *